United States Patent
Joshi et al.

(10) Patent No.: US 11,441,394 B1
(45) Date of Patent: Sep. 13, 2022

(54) DOWNHOLE GEOTHERMAL POWER GENERATION AND STORAGE

(71) Applicants: Mahendra L. Joshi, Katy, TX (US); Alireza Shahkarami, Yukon, OK (US); Robert Klenner, Edmond, OK (US); Michael Hughes, Oklahoma City, OK (US); Alexey Tyshko, Oklahoma City, OK (US); Robert Krumm, Oklahoma City, OK (US)

(72) Inventors: Mahendra L. Joshi, Katy, TX (US); Alireza Shahkarami, Yukon, OK (US); Robert Klenner, Edmond, OK (US); Michael Hughes, Oklahoma City, OK (US); Alexey Tyshko, Oklahoma City, OK (US); Robert Krumm, Oklahoma City, OK (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/349,704

(22) Filed: Jun. 16, 2021

(51) Int. Cl.
| | |
|---|---|
| *E21B 41/00* | (2006.01) |
| *F01D 15/10* | (2006.01) |
| *E21B 43/24* | (2006.01) |
| *F03G 4/00* | (2006.01) |
| *F01K 25/10* | (2006.01) |

(52) U.S. Cl.
CPC .......... *E21B 41/0085* (2013.01); *E21B 43/24* (2013.01); *F01D 15/10* (2013.01); *F03G 4/00* (2021.08); *F03G 4/045* (2021.08); *F01K 25/103* (2013.01); *F05B 2210/13* (2013.01); *F05B 2220/7064* (2013.01)

(58) Field of Classification Search
CPC ...... E21B 41/0085; E21B 43/24; F01D 15/10; F03G 4/00; F03G 4/045; F01K 25/103; F05B 2210/13; F05B 2220/7064
USPC .............................................. 60/641.2–641.4
See application file for complete search history.

(56) References Cited

U.S. PATENT DOCUMENTS

| | | | | |
|---|---|---|---|---|
| 3,939,356 | A * | 2/1976 | Loane | F03B 13/06 60/398 |
| 7,849,690 | B1 * | 12/2010 | Lakic | F03G 7/00 290/1 A |
| 8,915,084 | B2 * | 12/2014 | Rogers | F24T 10/15 60/641.2 |
| 8,991,510 | B2 * | 3/2015 | Saar | F24T 10/20 166/402 |
| 10,626,709 | B2 * | 4/2020 | Al-Dossary | F04D 13/04 |

(Continued)

OTHER PUBLICATIONS

Darvish K., "Selection of Optimum Working Fluid for Organic Rankine Cycle by Exergy and Exergy-Economic Analysis", 22 Pages, Published: Nov. 19, 2015, MDPI, Sustainability 2015, 7, 15362-15383; doi:10.3390/su71115362.

*Primary Examiner* — Hoang M Nguyen
(74) *Attorney, Agent, or Firm* — Cantor Colburn LLP

(57) ABSTRACT

A system and method of generating electricity. A work string extends into a wellbore. A heat pump unit at a surface location circulates a working fluid through the work string to absorb heat from a formation surrounding the wellbore. A turbine generates a rotation from the working fluid that has absorbed the heat. A generator generates electricity from the rotation of the turbine. The electricity is transmitted to the surface location via an electrical cable.

15 Claims, 6 Drawing Sheets

(56) References Cited

U.S. PATENT DOCUMENTS

2011/0282807 A1* 11/2011 Colello .................. H02J 3/322
    320/128
2012/0249065 A1* 10/2012 Bissonette ............. B60L 53/63
    320/109

* cited by examiner

US 11,441,394 B1

DOWNHOLE GEOTHERMAL POWER GENERATION AND STORAGE

BACKGROUND

In the geothermal energy production, water is generally injected into a geothermal formation for heat extraction. The extracted hot water is then sent to a surface facility equipped with a steam turbine for power generation using a Rankine cycle. The steam from the turbine stage is cooled and sent to injection pumps for re-injection into the formation. Such energy production processes require a large scale facility and a high temperature formation, such as above 350° F. Also, matching energy supply and demand at remote geothermal locations is unfeasible. Accordingly, there is a need for an economically feasible method of geothermal energy production.

SUMMARY

In an embodiment, a method of generating electricity is disclosed. A working fluid is injected from a surface location into a wellbore having a work string disposed therein, the work string including a downhole turbine and a downhole generator. The working fluid absorbs heat from a formation surrounding the wellbore, generating a rotation at the turbine via the working fluid that has absorbed the heat, generating electricity at the generator from the rotation of the turbine. The electricity is transmitted to the surface location.

In another embodiment, a system for generating electricity is disclosed. The system includes a work string extending into a wellbore, a heat pump unit at a surface location for circulating a working fluid through the work string to absorb heat from a formation surrounding the wellbore, a turbine for generating a rotation from the working fluid that has absorbed the heat, a generator for generating electricity from the rotation of the turbine, and an electrical cable for transmitting the electricity to the surface location.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
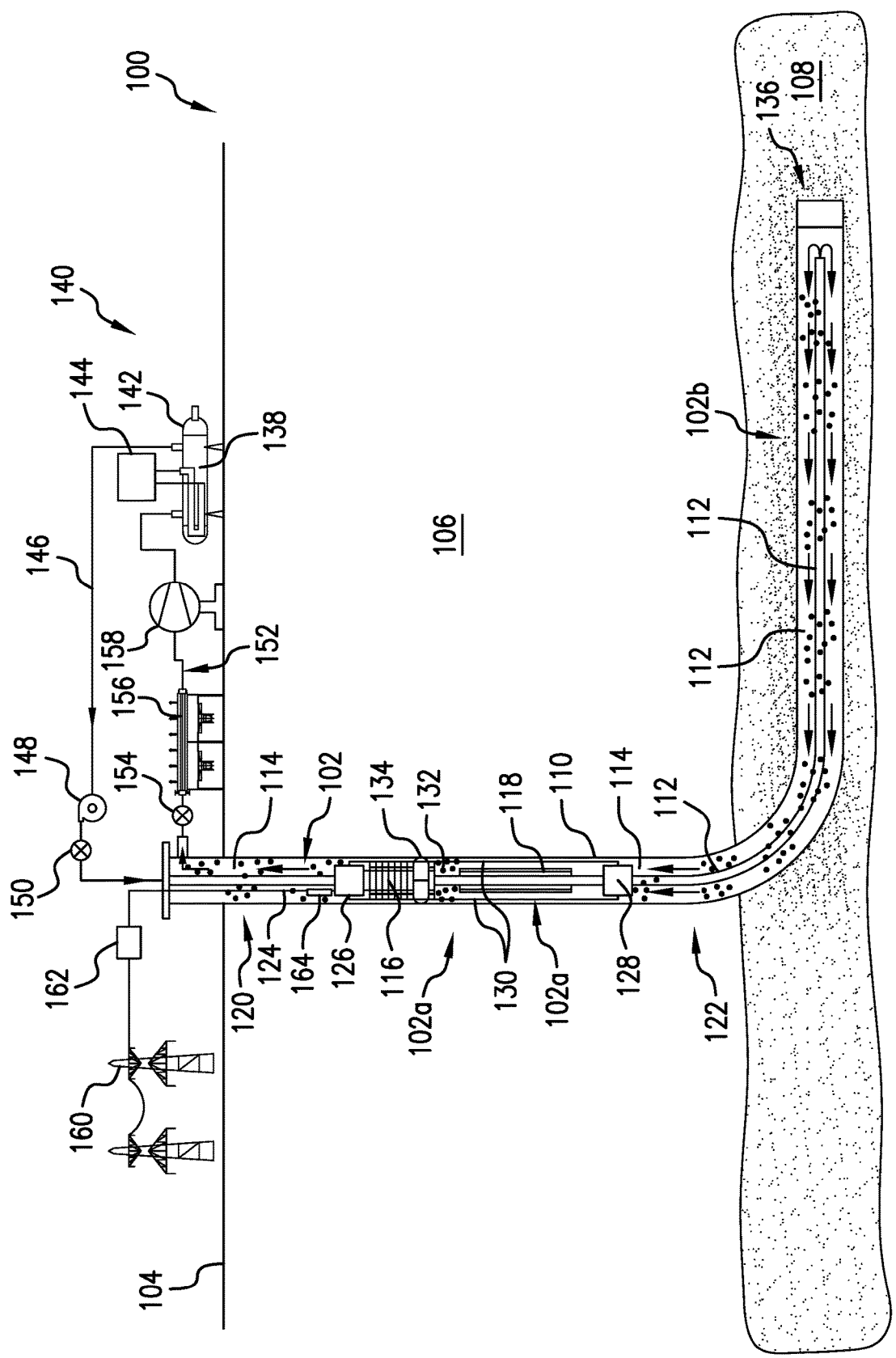
FIG. 1 shows a geothermal power generation system for generating electricity for use in an electrical power grid, in an illustrative embodiment.

Referring to FIG. 1, a geothermal power generation system 100 is shown for generating electricity for use in an electrical power grid 160. The geothermal power generation system 100 includes a wellbore 102 extending from a surface location 104 through an earth formation 106 and extending into a reservoir 108 in the earth formation 106. In various embodiments, the wellbore 102 is in place due to a prior production operation for retrieving hydrocarbon from the reservoir 108.

As shown in FIG. 1, the wellbore 102 includes a vertical section 102a and a horizontal section 102b, although this is not meant to be a limitation of the invention. In various embodiments, the wellbore 102 is a cased wellbore having a casing 110 extending along a length of the wellbore 102. A work string 112 extends along a length of the wellbore 102. The work string can be a production string used in a prior production operation, for example. An annulus 114 is defined between the work string 112 and the casing 110.

In various embodiments, the wellbore 102 is selected for geothermal energy generation that has reached or is nearing an end of life with respect to oil, water and/or gas production. The wellbore 102 is sealed prior to energy geothermal generation. Sealing the wellbore 102 can include using a fine mesh size frac sand or proppant and pressure pumping below fracturing pressure. Sealing can include closing up any perforations previous formed in the casing 110 for production purposes.

A turbine 116 and a generator 118 are provided along the work string 112 at a downhole location. The turbine 116 and the generator 118 separate the work string 112 into a first section 120 between the surface location 104 and the turbine 116 and a second section 122 downhole of the generator 118. In various embodiments, the turbine 116 is an electric submersible pump (ESP) that is used during a production operation to pump fluids from the wellbore 102 to the surface location 104 and the generator 118 is a motor of the ESP that is electrically powered from the surface location 104 during the production operation to provide a rotation to the pump. As used in geothermal energy production operation disclosed herein, however, fluid flows through the turbine 116 to cause a rotation at the turbine that is transferred to the generator 118 via a shaft connecting the turbine and the generator 118. The rotation of the generator 118 induces an electrical current that can be transmitted to the surface location via electrical cable 124. The electrical cable 124 is coupled to the generator 118 at the downhole location and to an electrical power grid 160 at the surface location 104. A converter 162 can be located along the electrical cable 124 to convert the electricity in the electrical cable 124 for use at the electrical power grid 160.

In an embodiment, an AC to DC converter 164 is located near the generator 118 to convert AC voltage/current from the generator 118 to a DC voltage/current for transmission through the electrical cable 124. The generator 118 produces AC voltage/current feeding 3-phase cable. Using the AC to DC converter 164 and an electrical cable 124 with the same wire total cross-section as a 3-phase cable and same voltage isolation ratings allows transmission of higher power to the electrical power grid 60 via DC voltage/current due to lower cable losses.

A first bypass manifold 126 is located in the first section 120 of the wellbore 102 above the turbine 116. A second bypass manifold 128 is located in the second section 122 of the wellbore 102 below the generator 118. A bypass tube 130 extends from the first bypass manifold 126 to the second bypass manifold 128. The first bypass manifold 126 provides a fluid connection between an opening in the work string 112 in the first section 120 and an inlet of the bypass tube 130. The second bypass manifold 128 provides a fluid connection between an outlet of the bypass tube 130 and an opening in the work string 112 in the second section 122. The first bypass manifold 126, second bypass manifold 128 and bypass tube 130 therefore provide a channel or conduit by which a fluid flowing downhole through an interior of the work string 112 in the first section 120 can be delivered to the interior of the work string 112 in the second section 122 without passing through either the turbine 116 or the generator 118.

The turbine 116 includes a gas intake 132 located at its downhole end. An isolation packer 134 is located at the turbine 116 and can be expanded to seal the annulus 114 at the turbine 116. Thus, a fluid or gas arriving at the turbine 116 by traveling uphole through the annulus 114 is blocked from further upward progress through the annulus 114 by the expanded isolation packer 134 and is instead diverted into the gas intake 132 of the turbine 116. The fluid or gas then passes through the turbine 116 and exits the turbine 116 into the annulus 114 in the first section 120 of the wellbore 102.

At the surface location 104, a heat pump unit 140 includes equipment for circulating a heat transfer fluid or a working fluid 138 through the wellbore 102. The heat pump unit 140 includes a storage tank 142 that stores the working fluid 138. In various embodiments, the working fluid 138 can be a hydrocarbon or carbon dioxide. Examples of hydrocarbons suitable for use as a working fluid in the geothermal power generation system 100 includes, but is not limited to, R134a (1,1,1,2-Tetrafluoroethane), R227ea (1,1,1,2,3,3,3-Heptafluoropropane), R245fa (1,1,1,3,3-Pentafluoropropane), R123 (2,2-Dichloro-1,1,1-trifluoroethane), R600 (n-butane), Toluene, Iso-butane, Iso-pentane and n-pentane. The $CO_2$ can be in the form of liquid $CO_2$ when stored at the storage tank 142.

A refrigeration device 144 maintains the working fluid 138 at a selected temperature in the storage tank 142. An injection line 146 from the storage tank 142 includes an injection pump 148 that injects the working fluid 138 into the work string 112 at the surface location 104 and an injection valve 150 for controlling a flow of the working fluid 138 into the work string 112.

The working fluid 138 is circulated downhole through the interior of the work string 112 the first section 120, through the bypass tube 130 and through the interior of the work string 112 in the second section 122 to exit into the annulus 114 at a bottom end 136 of the work string 112. The working fluid 138 then flows uphole through the annulus 114. As shown in FIG. 1, the horizontal section 102b of the work string 112 is disposed in the reservoir 108. As the working fluid 138 flows through the second section 122 and through the annulus 114 within the second section 122, the heat from the reservoir 108 causes the working fluid to evaporate to a working gas. The working gas flows uphole through the annulus 114 and is diverted through the turbine 116 to causes a rotation at the turbine 116. The rotation of the turbine 116 causes a rotation at the generator 118 which thereby generates an electrical current that is provided uphole via the electrical cable 124.

The working gas continues to flow uphole through the annulus 114 between the turbine 116 and the surface location 104 and enters a return line 152 at the surface location 104. The return line 152 includes a return valve 154, a cooler or condenser 156 and a compressor 158. The return valve 154 controls a flow of the working gas. The condenser 156 reduces the temperature of the returning working gas. The compressor 158 converts the working gas to the working fluid 138, which is then stored to the storage tank 142.

Figure 2:
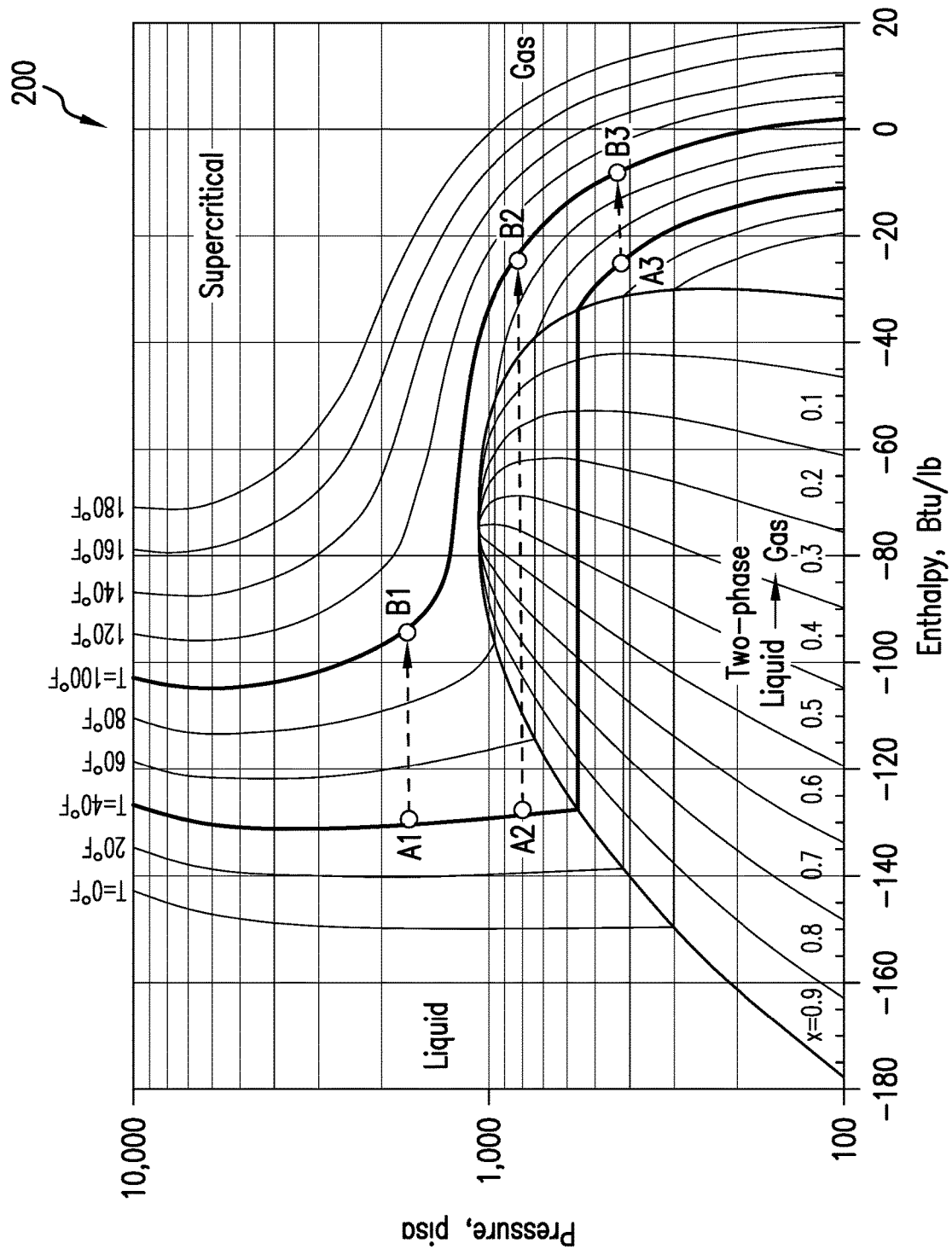
FIG. 2 shows a pressure/enthalpy chart for a working fluid used in the geothermal power generation system of FIG. 1.

FIG. 2 shows a pressure/enthalpy chart 200 for the working fluid 138 used in the geothermal power generation system 100 of FIG. 1. Enthalpy is shown along the abscissa (in Btu/lb) and pressure is shown along the ordinate axis (in psia). The working fluid 138 is carbon dioxide ($CO_2$) in an exemplary embodiment. The working fluid 138 is injected into the reservoir 108 in a liquid form at 40° F., 800 psig, as shown at A2 on the pressure/enthalpy chart 200. The working fluid 138 is heated by heat from the reservoir 108 to a working gas at 180° F., 700 psig, as shown at B2. The net enthalpy change in the working gas is about −40 Btu/lb. Therefore, a turbine that operates with a liquid $CO_2$ injection rate of at 10,000 bbl/day yields 116,770 lb/hr. At this rate, the change in the total enthalpy for $CO_2$ working fluid is about 4.67 MM Btu/hr. A gross power generation at this rate can yield about 1.4 MW. The temperature of the working gas decreases it flows uphole, thereby diminishing the energy stored therein. In order to provide a maximal or substantially maximal electricity formation, the turbine 116 can be placed at a depth at which the heated working gas has maximal a maximal or substantially maximal enthalpy.

Figure 3:
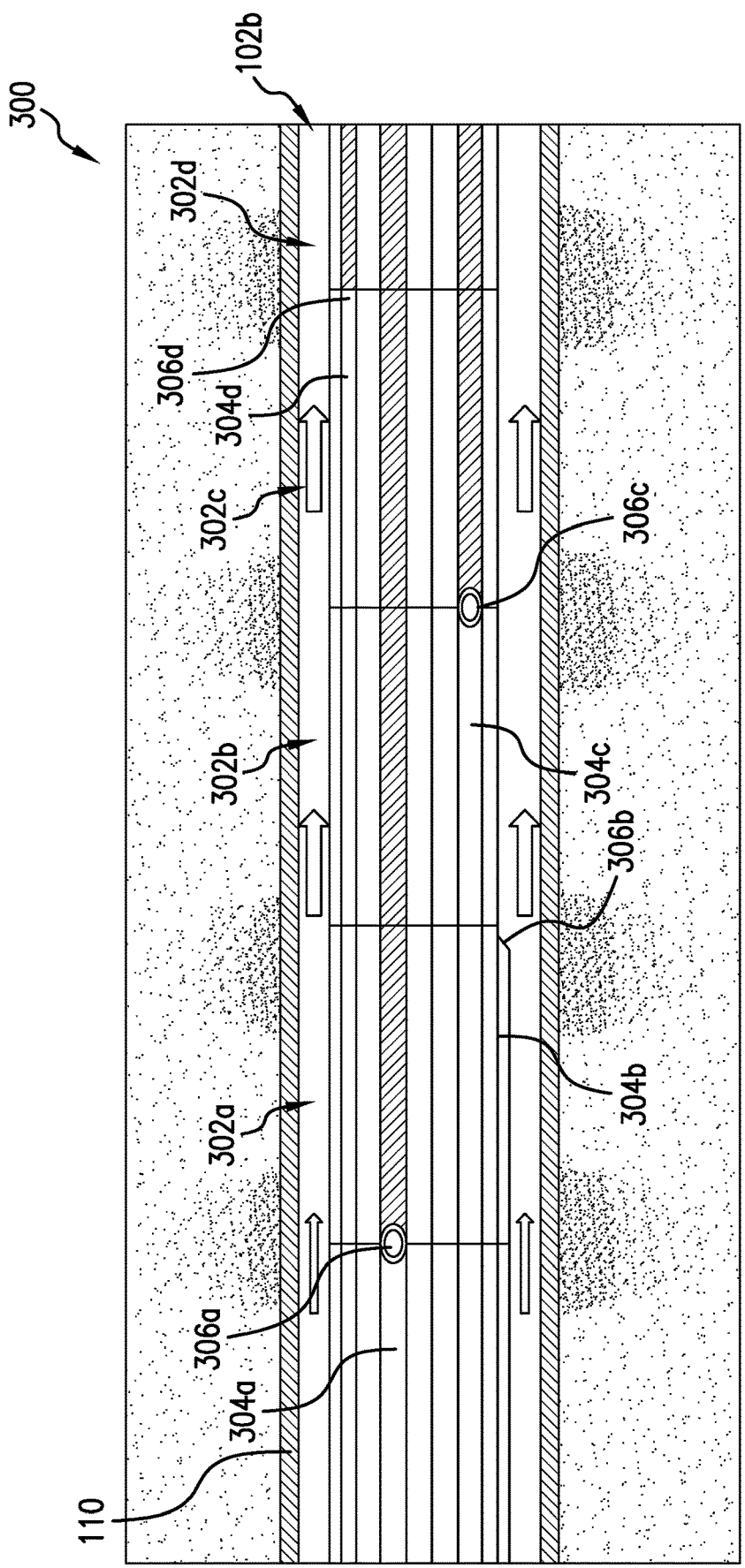
FIG. 3 shows a multistage injection pipe system in a horizontal section of a wellbore traversing a reservoir in the geothermal power generation system.

FIG. 3 shows a multistage injection pipe system 300 in a horizontal section 102b of the wellbore 102 traversing the reservoir 108. The horizontal section 102b receives the working fluid 138 from the surface location 104 and includes a plurality of injection stages, such as first injection stage 302a, second injection stage 302b, third injection stage 302c, and fourth injection stage 302d. The injection pipe system 30 includes a plurality of injection pipes (e.g., first injection pipe 304a, second injection pipe 304b, third injection pipe 304c and fourth injection pipe 304d) that are provided downhole through the casing 110 to deliver the working fluid 138 to the various injection stages the horizontal section 102b.

The first injection pipe 304a includes a first outlet 306a for injecting the working fluid into the first injection stage 302a. Similarly, the second injection pipe 304b includes a second outlet 306b for injecting the working fluid into the second injection stage 302b, the third injection pipe 304c includes a third outlet 306c for injecting the working fluid into the third injection stage 302c, and the fourth injection pipe 304d includes a fourth outlet 306d for injecting the working fluid into the fourth injection stage 302d.

Figure 4:
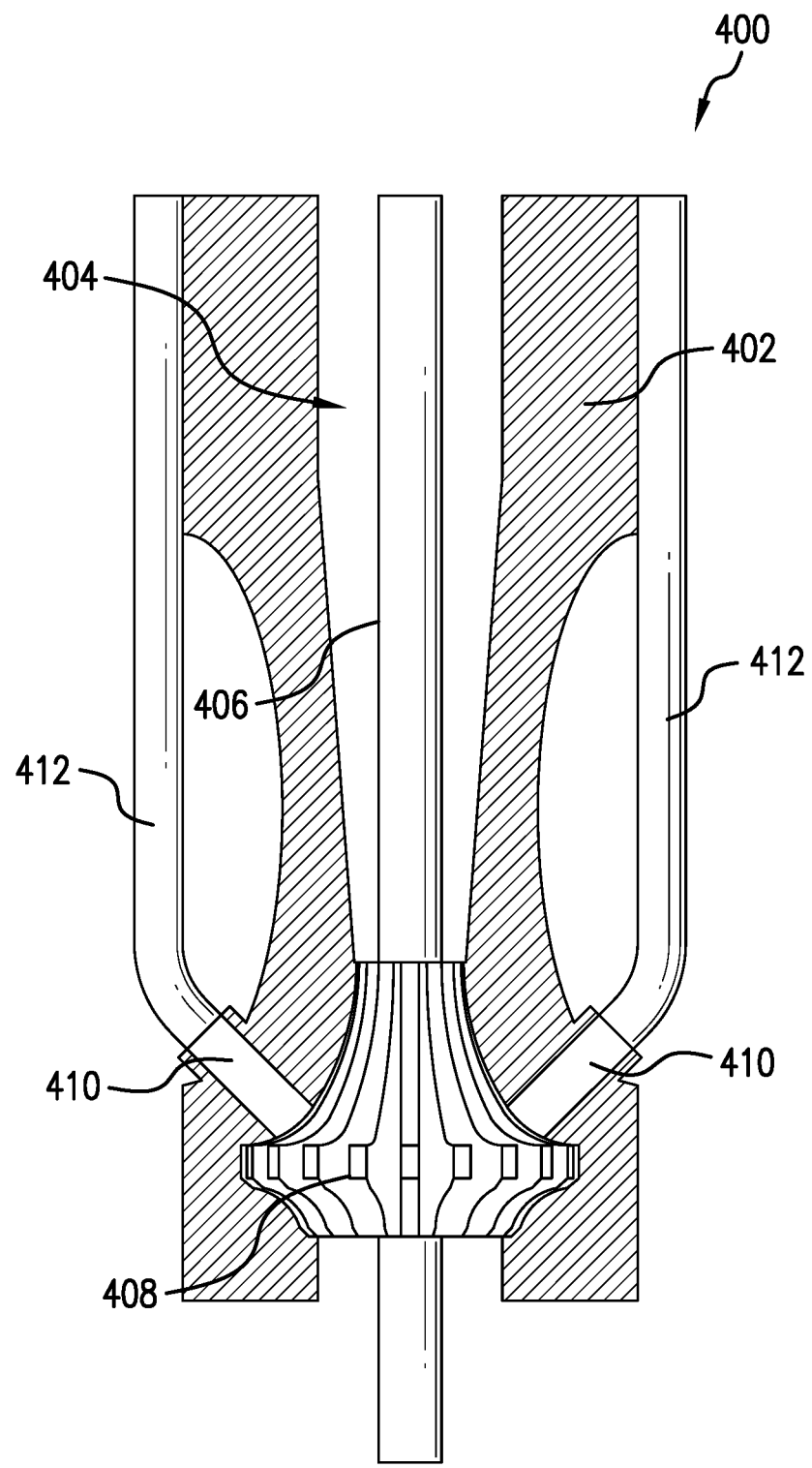
FIG. 4 shows a cross-sectional view a turbine stage of a turbine having multiple stages.

FIG. 4 shows a cross-sectional view a turbine stage 400 of a turbine 116 having multiple stages. The turbine stage 400 includes a housing 402 that has a longitudinal bore 404 therethrough and a turbine rotor 406. A shaft 408 disposed within the longitudinal bore 404 is coupled to a turbine rotor 406 and extends through the longitudinal bore 404 to a generator rotor (not shown) at the generator 118. The housing 402 includes an inlet 410 that allows a heated working fluid or working gas into housing 402. An injection pipe 412 is coupled to the inlet 410 and delivers the heated working gas into the housing 402 via the inlet 410. The working gas passes through the turbine rotor 406 to generate a rotation of the turbine rotor 406. The rotation is then transmitted to the generator rotor via the shaft 408. The working gas flows from the turbine rotor 406 uphole via the longitudinal bore 404 to the surface location 104.

In various embodiments, the turbine 116 can have a plurality of turbine stages, with the turbine rotor or each stage coupled to the shaft 408. In an illustrative embodiment, a multi-stage turbine includes four turbine stages associated, respectively, with first injection stage 302a, second injection stage 302b, third injection stage 302c, and fourth injection stage 302d of FIG. 3.

Figure 5:
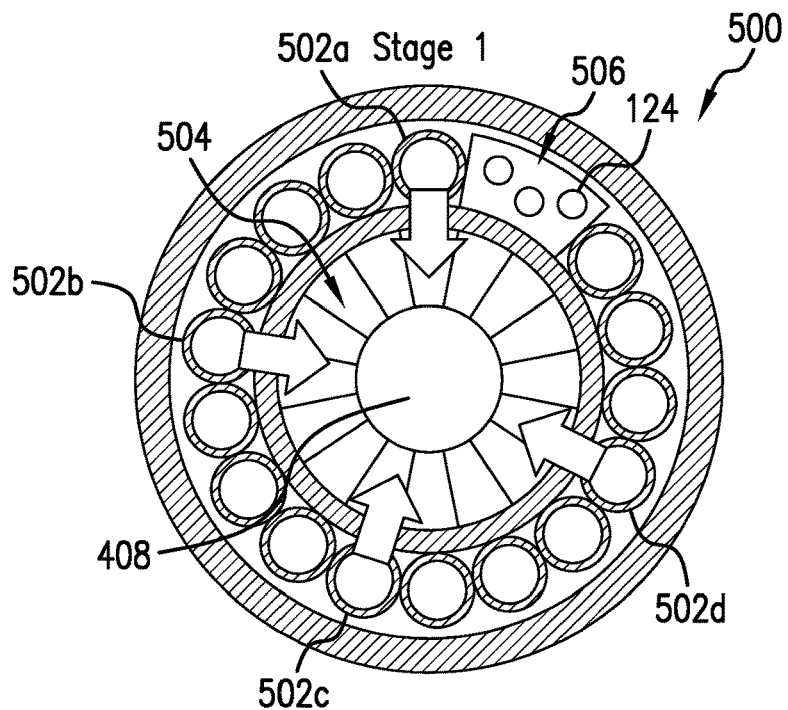
FIG. 5 shows a first top cross-sectional view the injection pipe system at a first turbine stage located at first injection stage of FIG. 3.

FIGS. 5-8 shows top cross-sectional views of the injection pipe system 300 at various stages of the wellbore. FIG. 5 shows a first top cross-sectional view of the injection pipe system 300 at a first turbine stage located at first injection stage 302a of FIG. 3. As shown in FIG. 5, the injection pipe system 300 includes 16 pipes for flow of a working gas. The pipes are separated into four groups, one for each injection stage (302a, 302b, 302c, 320d) shown in FIG. 3. These groups include first-stage pipes (502a, 502b, 502c, 502d), second-stage pipes (602a, 602b, 602c, 602d), third-stage pipes (702a, 702b, 702c, 702d) and fourth-stage pipes (802a, 802b, 802c, 802d). At the first injection stage 302a, the first-stage pipes (502a, 502b, 502c, 502d) output the working gas flowing therein into the associated turbine rotor 504. As shown in FIGS. 5-8 an insulation 506 extends along a length of the injection pipe system 300 and insulates the electrical cable 124 from a surrounding environment.

Figure 6:
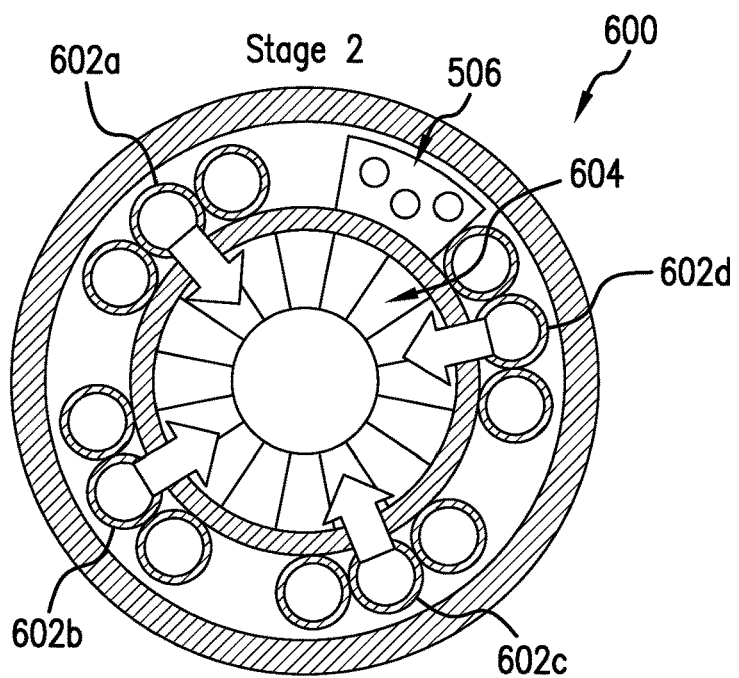
FIG. 6 shows a second top cross-sectional view of the injection pipe system at a second turbine stage located at the second injection stage of FIG. 3.

FIG. 6 shows a second top cross-sectional view 600 of the injection pipe system 300 at a second turbine stage located at the second injection stage 302b of FIG. 3. The first-stage pipes (502a, 502b, 502c, 502d) are not present in the second top cross-sectional view 600 because they do not extend to the second injection stage 302b. At the second injection stage 302b, the second-stage pipes (602a, 602b, 602c, 602d) output the working gas flowing therein into the associated turbine rotor 604.

Figure 7:
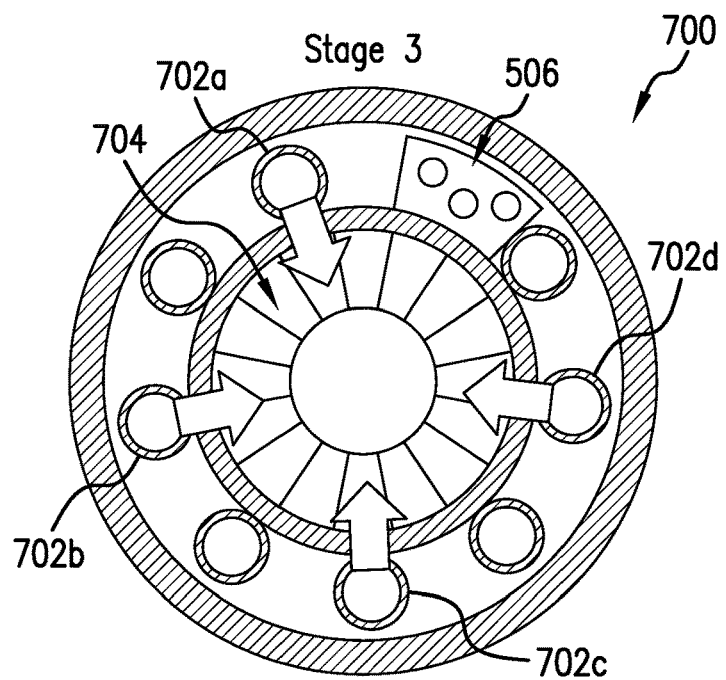
FIG. 7 shows a third top cross-sectional view of the injection pipe system at a third turbine stage located at the third injection stage of FIG. 3.

FIG. 7 shows a third top cross-sectional view 700 of the injection pipe system 300 at a third turbine stage located at the third injection stage 302c of FIG. 3. The first-stage pipes (502a, 502b, 502c, 502d) and second-stage pipes (602a, 602b, 602c, 602d) are not present in in the third top cross-sectional view 700 because they do not extend to the third injection stage 302c. At the third injection stage 302c, the third-stage pipes (702a, 702b, 702c, 702d) output the working gas flowing therein into the associated turbine rotor 704.

Figure 8:
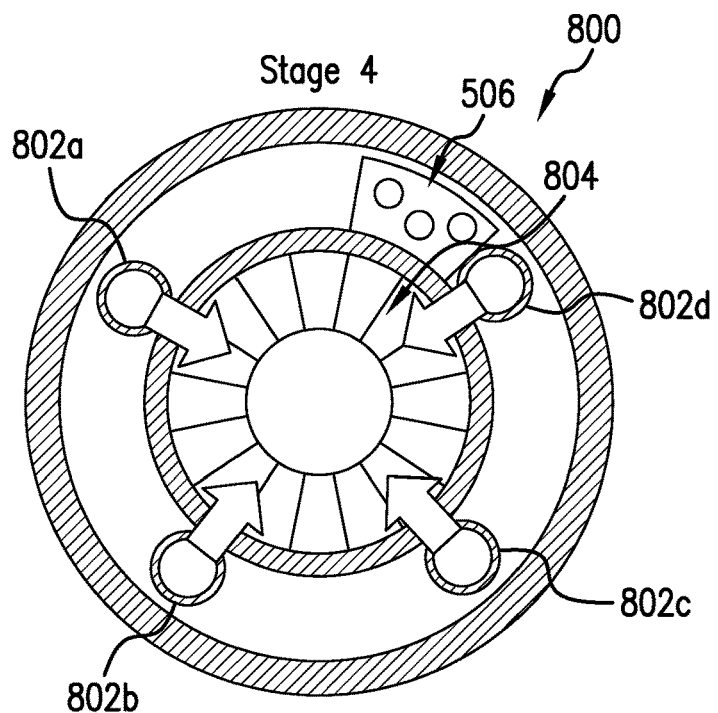
FIG. 8 shows a fourth top cross-sectional view of the injection pipe system at a fourth turbine stage located at the fourth injection stage of FIG. 3.

FIG. 8 shows a fourth top cross-sectional view 800 of the injection pipe system 300 at a fourth turbine stage located at the fourth injection stage 302d of FIG. 3. The first-stage pipes (502a, 502b, 502c, 502d), second-stage pipes (602a, 602b, 602c, 602d) and third-stage pipes (702a, 702b, 702c, 702d) are not present in the fourth top cross-sectional view 800 because they do not extend to the fourth injection stage 302d. At the fourth injection stage 302d, the fourth-stage pipes 802a, 802b, 802c, 802d) output the working gas flowing therein into the associated turbine rotor 804.

Set forth below are some embodiments of the foregoing disclosure:

Embodiment 1: A method of generating electricity. The method includes: injecting a working fluid from a surface location into a wellbore having a work string disposed therein, the work string including a downhole turbine and a downhole generator, wherein the working fluid absorbs heat from a formation surrounding the wellbore, generating a rotation at the turbine via the working fluid that has absorbed the heat, generating electricity at the generator from the rotation of the turbine, and transmitting the electricity to the surface location.

Embodiment 2: The method of any prior embodiment, wherein the working fluid absorbs the heat to form a working gas, further comprising generating the rotation at the turbine via the working gas.

Embodiment 3: The method of any prior embodiment, wherein the turbine has a plurality of turbine stages, each turbine stage located at an injection stage of the wellbore.

Embodiment 4: The method of any prior embodiment, further comprising injecting the working fluid into the plurality of stages through a plurality of injection pipes, wherein at least a first injection pipe has a first outlet associated with a first injection stage and at least a second injection pipe has a second outlet associated with a second injection stage.

Embodiment 5: The method of any prior embodiment, further comprising adjusting a location of the turbine in the wellbore to a location proximate a at which a phase transition of the working fluid occurs.

Embodiment 6: The method of any prior embodiment, wherein the working fluid is one of: (i) a hydrocarbon; and (ii) carbon dioxide.

Embodiment 7: The method of any prior embodiment, further comprising converting the electricity for use at a power grid at the surface location.

Embodiment 8: The method of any prior embodiment, further comprising sealing a skin of the wellbore to isolate the working fluid from the formation and allow heat to flow from the formation into the working fluid.

Embodiment 9: A system for generating electricity. The system includes: a work string extending into a wellbore, a heat pump unit at a surface location for circulating a working fluid through the work string to absorb heat from a formation surrounding the wellbore, a turbine for generating a rotation from the working fluid that has absorbed the heat, a generator for generating electricity from the rotation of the turbine, and an electrical cable for transmitting the electricity to the surface location.

Embodiment 10: The system of any prior embodiment, further comprising an AC to DC converter for converting AC current generated by the generator to a DC current for transmission along the electrical cable.

Embodiment 11: The system of any prior embodiment, wherein the turbine has a plurality of turbine stages, each turbine stage located at an injection stage of the wellbore.

Embodiment 12: The system of any prior embodiment, further comprising a plurality of injection pipes for injecting the working fluid into the plurality of stages, wherein at least a first injection pipe has a first outlet associated with a first injection stage and at least a second injection pipe has a second outlet associated with a second injection stage.

Embodiment 13: The system of any prior embodiment, wherein the turbine is located at a depth at which a phase transition of the working fluid occurs.

Embodiment 14: The system of any prior embodiment, wherein the working fluid is one of: (i) a hydrocarbon; and (ii) carbon dioxide.

Embodiment 15: The system of any prior embodiment, further comprising a power grid at the surface location receiving the electricity from the electric cable.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of generating electricity, comprising:
   injecting a working fluid from a surface location into a wellbore having a work string disposed therein, the work string including a downhole turbine and a downhole generator, wherein the fluid is injected into the wellbore via the work string and exits the work string into an annulus of the wellbore below the downhole turbine and the downhole generator, wherein the working fluid in the annulus absorbs heat from a formation surrounding the wellbore;
   diverting an uphole flow of the working fluid in the annulus into the downhole turbine;
   generating a rotation at the turbine via the working fluid;
   generating electricity at the generator from the rotation of the turbine; and
   transmitting the electricity to the surface location.

2. The method of claim 1, wherein the working fluid absorbs the heat to form a working gas, further comprising generating the rotation at the turbine via the working gas.

3. The method of claim 1, wherein the turbine has a plurality of turbine stages, each turbine stage located at an injection stage of the wellbore.

4. The method of claim 3, further comprising injecting the working fluid into the plurality of stages through a plurality of injection pipes, wherein at least a first injection pipe has a first outlet associated with a first injection stage and at least a second injection pipe has a second outlet associated with a second injection stage.

5. The method of claim 1, further comprising adjusting a location of the turbine in the wellbore to a location proximate a at which a phase transition of the working fluid occurs.

6. The method of claim 1, wherein the working fluid is one of: (i) a hydrocarbon; and (ii) carbon dioxide.

7. The method of claim 1, further comprising converting the electricity for use at a power grid at the surface location.

8. The method of claim 1, further comprising sealing a skin of the wellbore to isolate the working fluid from the formation and allow heat to flow from the formation into the working fluid.

9. A system for generating electricity, comprising:
   a work string extending into a wellbore;
   a turbine disposed on the work string for generating a rotation from a working fluid; and
   a generator on the work string for generating electricity from the rotation of the turbine;
   an electrical cable for transmitting the electricity to the surface location;
   a heat pump unit at a surface location for circulating a working fluid through the work string to exit into an annulus between the work string, wherein the working fluid absorbs heat from a formation surrounding the wellbore; and
   a gas intake for directing the working fluid from the annulus into the turbine.

10. The system of claim 9, further comprising an AC to DC converter for converting AC current generated by the generator to a DC current for transmission along the electrical cable.

11. The system of claim 9, wherein the turbine has a plurality of turbine stages, each turbine stage located at an injection stage of the wellbore.

12. The system of claim 11, further comprising a plurality of injection pipes for injecting the working fluid into the plurality of stages, wherein at least a first injection pipe has a first outlet associated with a first injection stage and at least a second injection pipe has a second outlet associated with a second injection stage.

13. The system of claim 9, wherein the turbine is located at a depth at which a phase transition of the working fluid occurs.

14. The system of claim 9, wherein the working fluid is one of: (i) a hydrocarbon; and (ii) carbon dioxide.

15. The system of claim 9, further comprising a power grid at the surface location receiving the electricity from the electric cable.

* * * * *